United States Patent
Hainz et al.

(10) Patent No.: US 9,973,835 B2
(45) Date of Patent: *May 15, 2018

(54) SIGNAL GENERATOR, A DECODER, A METHOD FOR GENERATING A TRANSMIT SIGNAL AND A METHOD FOR DETERMINING SPEED DATA

(71) Applicant: Infineon Technologies AG, Neubiberg (DE)

(72) Inventors: Simon Hainz, Villach (AT); Tobias Werth, Villach (AT); Michael Westpfahl, Gmund (DE); Robert Hermann, Voelkermarkt (AT); Lorenzo Coceani, Villach (AT); Dirk Hammerschmidt, Finkenstein (AT)

(73) Assignee: Infineon Technologies AG, Neubiberg (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/363,249

(22) Filed: Nov. 29, 2016

(65) Prior Publication Data

US 2017/0150240 A1    May 25, 2017

Related U.S. Application Data

(63) Continuation-in-part of application No. 13/751,335, filed on Jan. 28, 2013.

(51) Int. Cl.
  *G08C 19/16* (2006.01)
  *G08C 19/20* (2006.01)
  *H04Q 9/14* (2006.01)
(52) U.S. Cl.
  CPC .................. *H04Q 9/14* (2013.01)

(58) Field of Classification Search
  CPC ........................................... H04Q 9/14
  See application file for complete search history.

(56) References Cited

U.S. PATENT DOCUMENTS 5,745,048 A * 4/1998 Taguchi ............. B60R 16/0315
  340/870.01
6,480,138 B1 * 11/2002 Zinke ................. B60R 16/0315
  340/870.24

(Continued)

FOREIGN PATENT DOCUMENTS

WO    2007001254 A1    1/2007

OTHER PUBLICATIONS

Philips—KMI21/1 Rotational Speed Sensor for Extended Air Gap Application and Direction Detection, Sep. 4, 2000.*

(Continued)

*Primary Examiner* — Quang D Pham
(74) *Attorney, Agent, or Firm* — Eschweiler & Potashnik, LLC

(57) ABSTRACT

A signal generator comprises a signal provider and a signal processing unit. The signal provider is configured to provide a sensor signal indicating a repeatedly detected event, occurring within differing time intervals. The signal processing unit is configured to generate a transmit signal based on the sensor signal. The transmit signal comprises event information representing the temporal occurrence of the event and additional information representing additional data. The event information comprises pulses associated to detected events, wherein the pulses are temporarily separated within the transmit signal according to the differing time intervals of detected events so that each time interval of the differing time intervals comprises one pulse associated to a detected event. Further, the additional data comprises at least one frame comprising a predefined number of additional data (Continued)

bits. The information of the additional data bits of the at least one frame is distributed over at least two time intervals of the differing time intervals.

17 Claims, 15 Drawing Sheets

(56) References Cited

U.S. PATENT DOCUMENTS

| | | | | |
|---|---|---|---|---|
| 6,542,847 | B1* | 4/2003 | Lohberg | G01P 3/489 324/166 |
| 6,687,644 | B1* | 2/2004 | Zinke | B60C 23/04 702/145 |
| 7,830,278 | B2* | 11/2010 | Lohberg | G01D 5/145 341/11 |
| 9,008,217 | B2* | 4/2015 | Heim | G08C 15/06 375/219 |
| 2004/0100251 | A1* | 5/2004 | Lohberg | G01D 5/145 324/166 |
| 2004/0249544 | A1 | 12/2004 | Lohberg | |
| 2005/0169230 | A1* | 8/2005 | Haefner | G04R 20/10 370/345 |
| 2006/0078004 | A1* | 4/2006 | Partyka | H04W 52/0225 370/503 |
| 2007/0177321 | A1 | 8/2007 | Weiberle et al. | |
| 2009/0278711 | A1* | 11/2009 | Lohberg | G01D 5/145 341/11 |
| 2013/0101065 | A1* | 4/2013 | Heim | G08C 15/06 375/295 |

OTHER PUBLICATIONS

Infineon Technologies AG "TLE4942-TLE4942C Data Sheet—Differential Two-Wire Hall Effet Sensor IC." Published in Feb. 2002. 18 Pages.

Philips Discrete Semiconductors "KMI22/1 Data Sheet—Rotational Speed Sensor for Extended Air Gap Application and Direction Detection." Published on Sep. 4, 2000, 16 Pages.

Infineon Technologies AG. "TLE4941/4941C Product Brief—Smart Hali Effect ICs for Active Wheel Speed Sensing." Published in 2006, 2 Pages.

Final Office Action dated Jan. 29, 2016 for U.S. Appl. No. 13/751,335.

Non-Final Office Action dated Jul. 16, 2015 for U.S. Appl. No. 13/751,335.

* cited by examiner

FIG. 3
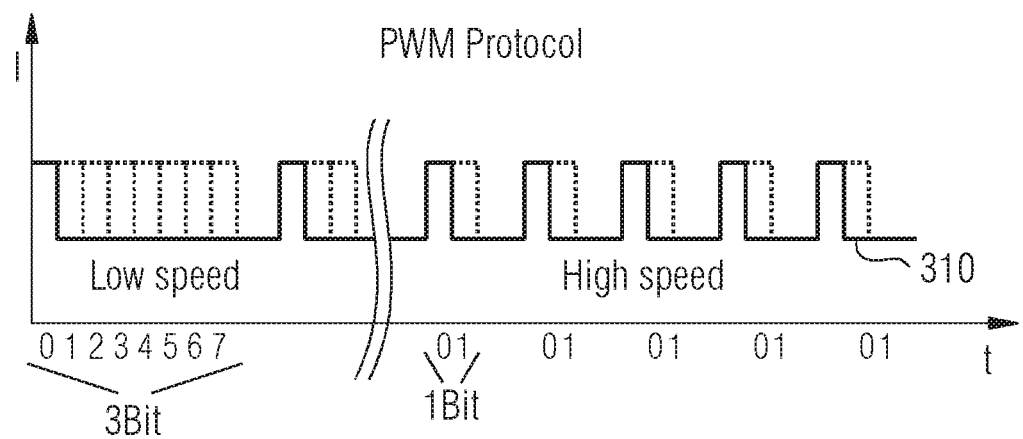
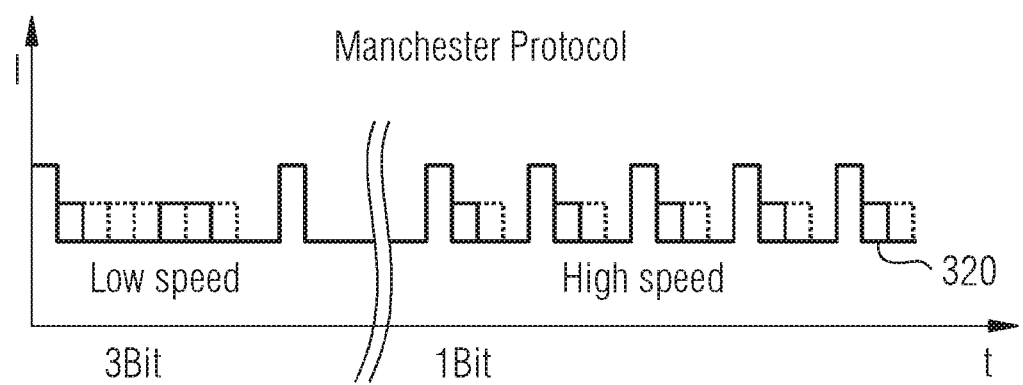

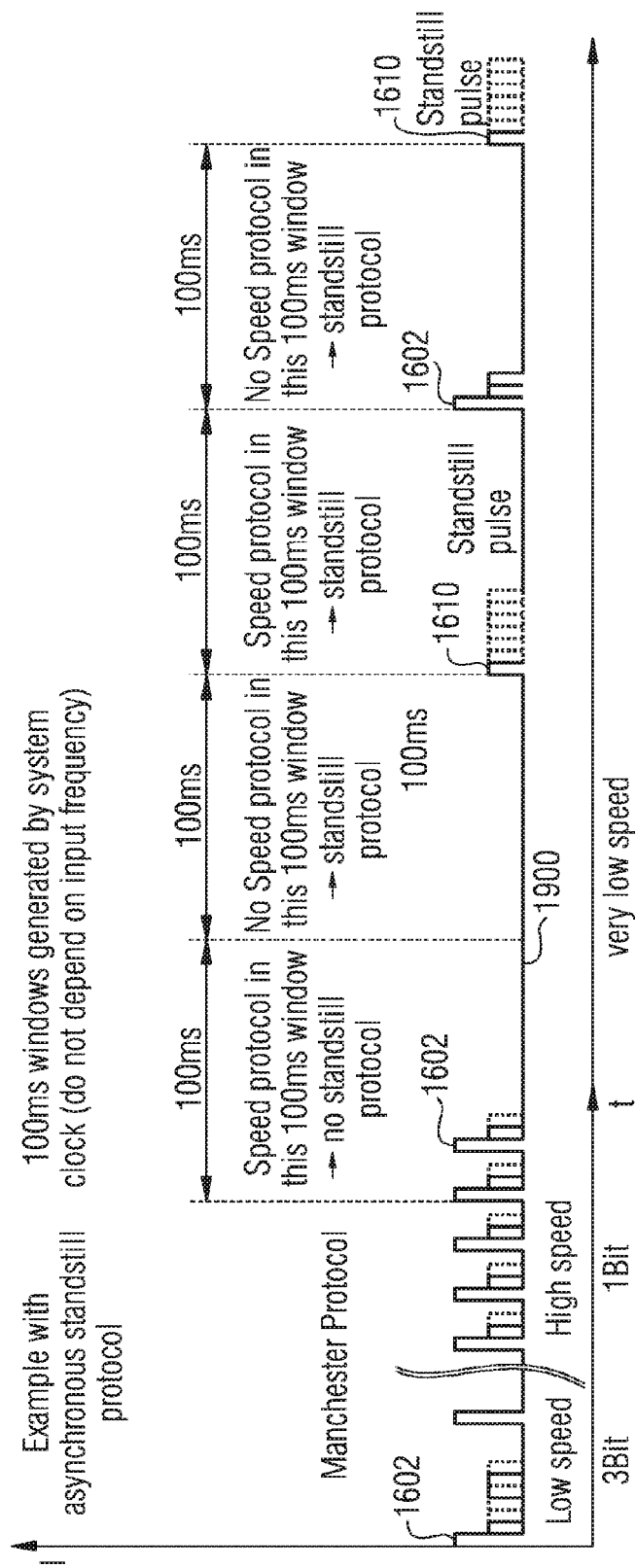

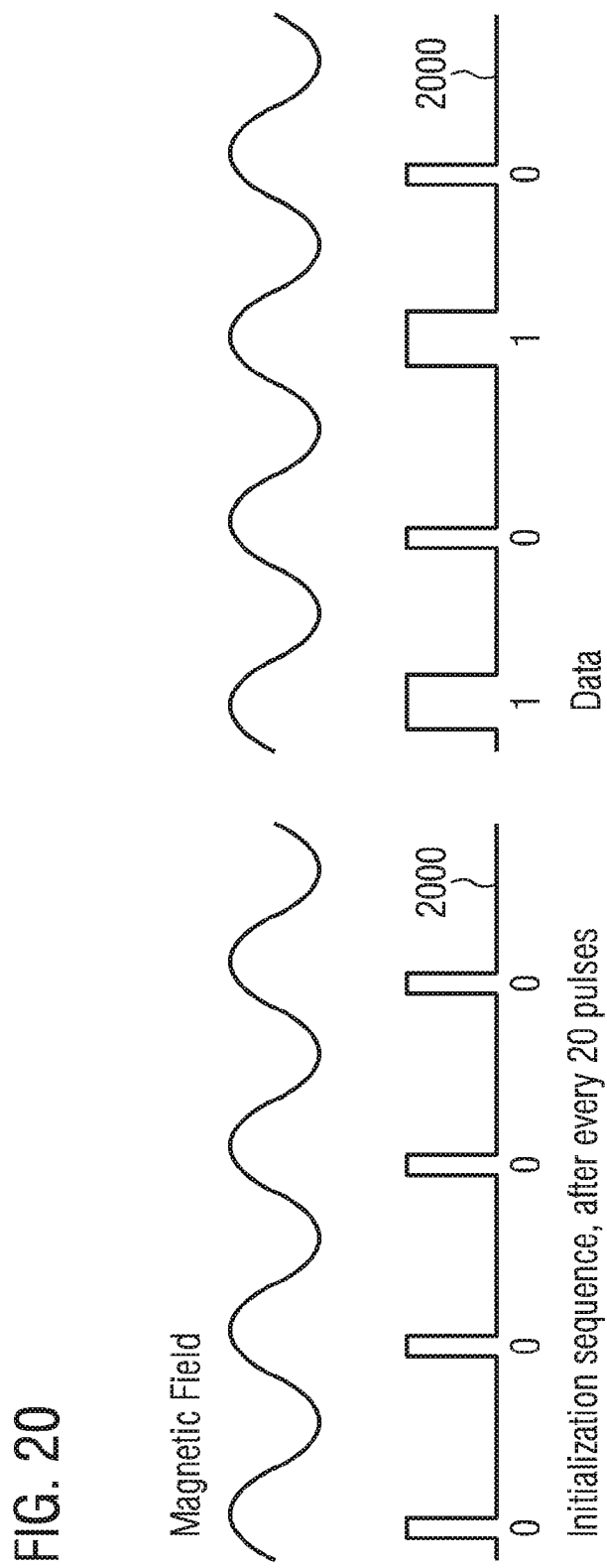

SIGNAL GENERATOR, A DECODER, A METHOD FOR GENERATING A TRANSMIT SIGNAL AND A METHOD FOR DETERMINING SPEED DATA

REFERENCE TO RELATED APPLICATION

This application is a continuation-in-part of U.S. application Ser. No. 13/751,335 filed on Jan. 28, 2013, the contents of which are incorporated by reference in their entirety.

FIELD

Embodiments relate to signal transmission concepts and in particular to a signal generator, a decoder, a method for generating a transmit signal and a method for determining speed data.

BACKGROUND

A huge variety of signal transmission concepts or protocols exist. Most of these concepts use constant time intervals for organizing data to be transmitted. However, there are applications in which repeatedly events occur at differing time intervals between two succeeding occurring events. For those applications, the mapping of the timely occurrence of the events within the transmit signal can be important to gather information about the timely behavior later on. For example, speed measurements of rotating or moving parts may be based on detecting repeatedly occurring events, which allow to determine the speed of the moving or rotating part.

For example, antilock braking system sensor interfaces (ABS), transmit a sequence of pulses which mark the edges of a magnetic encoder signal. This type of communication may be very effective for wheel speed measurements. However it does not allow to transmit other information that is available internally in the sensor. Nevertheless, it may be desired, to transmit also additional information together with the information necessary for the speed measurement.

SUMMARY

A signal generator according to an embodiment comprises a signal provider and a signal processing unit. The signal provider is configured to provide a sensor signal indicating a repeatedly detected event, occurring within differing time intervals. The signal processing unit is configured to generate a transmit signal based on the sensor signal. The transmit signal comprises event information representing the temporal occurrence of the event and additional information representing additional data. The event information comprises pulses associated to detected events, wherein the pulses are temporarily separated within the transmit signal according to the differing time intervals of detected events so that each time interval of the differing time intervals comprises one pulse associated to a detected event. Further, the additional data comprises at least one frame comprising a predefined number of additional data bits. The information of the additional data bits of the at least one frame is distributed over at least two time intervals of the differing time intervals.

Embodiments may be based on the finding that an arbitrary amount of additional data can be added to the information related to a repeatedly event, occurring at different times, by distributing the additional data over two or more of the differing time intervals between times the event occurs. By distributing the additional data over the differing time intervals, not only the transmission of additional data accompanying the event information in general but also the addition of a high or arbitrary amount of additional data may be enabled.

In some embodiments, the signal generator is configured to generate the transmit signal, so that an information of a number of bits of the additional data bits of the at least one frame comprised by a time interval of the differing time intervals varies in dependence on the length of the differing time intervals. In this way, the amount of additional data allocated to a time interval of the differing time intervals can be adapted to the available data capacity of the time interval. Time intervals with larger length may comprise larger data capacity than time intervals with shorter length. In this way, the data capacity (e.g. the maximal amount of data which can be transmitted during a time interval) may be efficiently utilized so that a high data rate can be obtained by the transmit signal.

Some embodiments relate to a signal generator comprising a sensor unit representing the signal provider. The sensor unit may be configured to detect the repeatedly event, occurring within different time intervals. In this way, a sensor system may be realized by the signal generator which is able to provide information of the repeatedly detected event and a high or arbitrary amount of additional data, for example.

Also some embodiments relate to a wheel speed sensor, a transmission speed sensor, a cam rotation speed sensor, a crankshaft rotation speed sensor, a rotation speed sensor or a position sensor with a signal generator according to the described concept.

BRIEF DESCRIPTION OF THE DRAWINGS

Some embodiments of apparatuses and/or methods will be described in the following by way of example only, and with reference to the accompanying figures, in which

FIG. 3 shows a schematic illustration of a transmit signal based on pulse width modulation and a transmit signal based on Manchester coding;

FIG. 19 shows a schematic illustration of another transmit signal based on Manchester coding including alive pulses; and FIG. 20 shows a schematic illustration of another transmit signal based on pulse width modulation.

DETAILED DESCRIPTION OF EMBODIMENTS

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
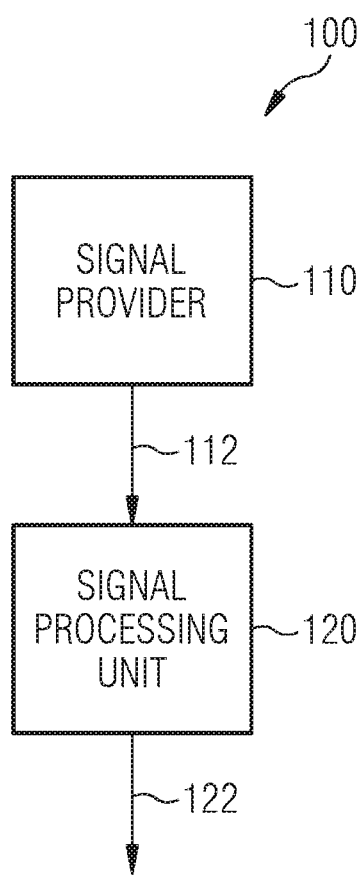
FIG. 1 shows a block diagram of a signal generator.

FIG. 1 shows a block diagram of a signal generator 100 according to an embodiment. The signal generator 100 comprises a signal provider 110 connected to a signal processing unit 120. The signal provider 110 provides a sensor signal 112 indicating a repeatedly detected event occurring within differing time intervals. The signal processing unit 120 generates a transmit signal 122 based on the sensor signal 112 so that the transmit signal 122 comprises event information representing the temporal or chronological occurrence of the event and additional information representing additional data. The event information comprises pulses associated to detected events, wherein the pulses are temporarily separated within the transmit signal according to the differing time intervals of detected events so that each time interval of the differing time intervals comprises one pulse associated to a detected event. Further, the additional data comprises at least one frame comprising a predefined number of additional data bits. The information of the additional data bits of the at least one frame is distributed over at least two time intervals of the differing time intervals.

Due to the distribution of additional data over several time intervals, a high or arbitrary amount of additional data can be provided together with temporal or chronological information about a repeatedly occurring event by the same transmit signal 122. Therefore, not only additional data in general but also a high or arbitrary amount of additional data can be provided.

The sensor signal 112 may contain information of the repeatedly detected event, occurring within differing time intervals in a way so that the signal processing unit 120 can determine the temporal occurrence of the event and generate pulses within the transmit signal representing this temporal behavior. For example, the pulses of succeeding time intervals are temporarily separated (e.g. the rising or the falling edges of the pulses) from each other by the length of the time interval between two succeeding occurring events or proportional to the length of the time interval between two succeeding occurring events. The pulse of a time interval may be located at the beginning or at the end of the time interval so that the pulse indicates the beginning or the end of the time interval, for example. If the pulse is at the beginning of the associated time interval, the pulse of the succeeding time interval may also indicate the end of the preceding time interval, for example. In other words, the temporal distance between two succeeding pulses within the transmit signal 122 represents a time interval between two succeeding occurring events within the sensor signal 112 and one of these pulses is associated to this time interval depending whether a pulse is defined to represent an end or a beginning of a time interval, for example. However, only one pulse may be associated to each time interval.

The repeatedly and within differing time intervals occurring event can represent a large variety of quantities. For example, an event may be a maximum, a minimum or a zero crossing of a magnetic or an electric field, a maximum, a minimum or a zero crossing of a light intensity or similar repeatedly occurring quantities. The event may occur in differing time intervals, since the occurrence of the event may be depending on a speed of travel or a rotational speed of a moving or a rotating part causing the magnetic or electric field or the varying light intensity or deflecting the magnetic or electric field or the varying light, for example. If the speed of travel or the rotational speed is high, the time intervals between two succeeding times the event occurs may be shorter than if the speed of travel or the rotational speed is low.

Differing time intervals may mean that at least two time intervals of the differing time intervals comprise a different temporal length. For example, if the speed of the occurrence of the event increases the time intervals may become proportionally shorter, and vice-versa.

The signal provider 110 may be a sensor unit generating the sensor signal 112 based on detecting the event or a memory unit storing and providing the sensor signal 112, for example.

The signal processing unit 120 generates the transmit signal 122 comprising pulses which are separated from each other by the differing time intervals or proportional to the differing time intervals so that the temporal occurrence of the event can be reconstructed by analyzing the temporal distribution of the pulses within the transmit signal 122, for example.

For example, the transmit signal 122 generated by the signal generator 120 may be a current signal so that a pulse may be represented by an increased current or a transmit signal 122 may be a voltage signal so that the pulse may be represented by an increased voltage. A pulse indicating an occurred event may comprise a predefined pulse length. The pulse length may be significantly shorter (e.g. <50%, 30%, 10%, 5%, 1% of a minimal time interval) than a minimal time interval of the differing time intervals.

A frame comprises a predefined number of additional data bits and may establish an amount of data belonging together. For example, the additional data bits of the at least one frame may be interpreted together by a decoder during the reconstruction of the additional data based on the transmit signal.

The information of an additional data bit can be added, allocated or assigned to a time interval in various ways. For example, the pulse of a time interval may be modulated in its width or coded sequences (e.g. Manchester coded) may be added to the time interval before or after the pulse of the time interval. In other words, the signal generator may map the information of the additional data bits of the at least one frame to the transmit signal 122 by using a pulse width modulation of the pulses associated to detected events comprised by the at least two time intervals or by adding Manchester coded sequences to the at least two time intervals, for example. Alternatively, an amplitude of the pulses of the at least two time intervals may be modulated according to the information of the additional data bits, for example. In this way, the information of the additional data bits can be mapped to the transmit signal 122 with low effort or low complexity.

The at least two time intervals containing information of the additional data bits of the at least one frame may be (directly) succeeding time intervals so that the information of at least one frame can be transmitted within a short time. Alternatively, the information of the additional data bits of the at least one frame may be distributed over not (directly) succeeding time intervals to reduce the probability of losing the bits of the whole frame due to disturbances during a transmission of the transmit data 122.

Figure 2:
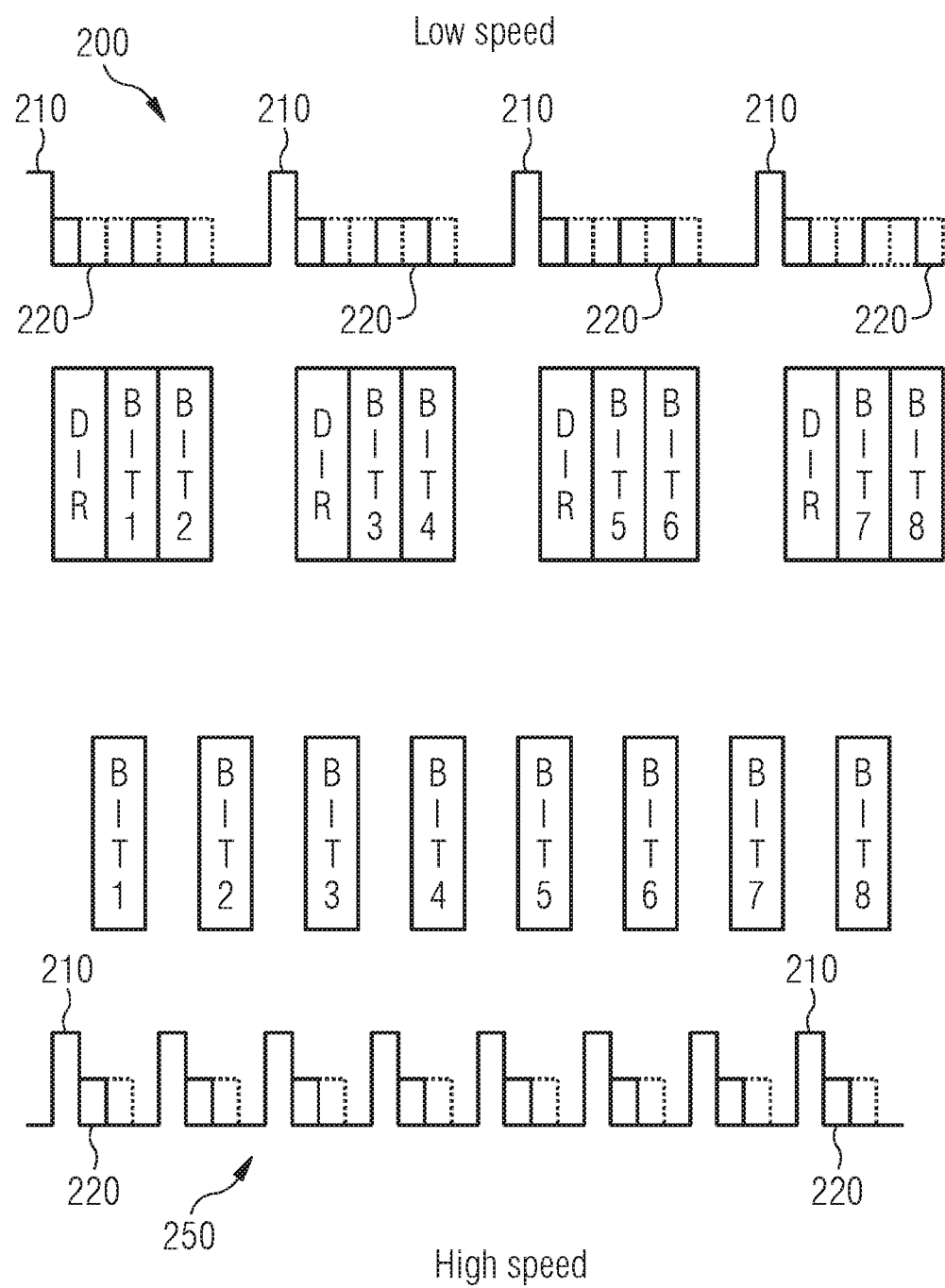
FIG. 2 shows a schematic illustration of a transmit signal at low speed and at high speed.

An example for the distribution of a frame comprising eight additional data bits for long time intervals (the events occur with low speed) and for short time intervals (the events occur with high speed) is shown in FIG. 2. When the event occurs with low speed a transmit signal 200 may comprise pulses 210 with large temporal distance (corresponding to the length of the time intervals) to each other. Between these pulses 210 additional data bits 220 can be added. For example, the transmit signal 200 comprises between each two succeeding pulses 210, three bits of data 220. One bit of the three bits represent a directional information (DIR) and two bits (BIT 1 to BIT 8) represent two bits of the additional data bits of the at least one frame. If the events occur with high speed, there may not be enough space between two succeeding pulses 210 within the transmit signal 250 to add three bits of additional data. Therefore, the information of only one bit 220 may be added to each time interval so that the at least one frame may be distributed over eight time intervals.

As already mentioned, the signal processing unit 120 may use pulse width modulation or Manchester coding for adding or allocating the information of the additional data bits to the different time intervals, for example. An example for a pulse width modulated transmit signal 310 and a Manchester coded transmit signal 320 is shown in FIG. 3. In other words, the pulses of the transmit signal 310 may comprise pulses with different length modulated according to a pulse width modulation protocol (PWM protocol). In this connection, more bits (e.g. three bits) of additional information can be modulated to each time interval, if the event occurs with low speed. Otherwise, if the event occurs with higher speed less additional data bits may be modulated to a time interval (e.g. 1 bit). The examples of the transmit signals 310, 320 shown in FIG. 3 are illustrated in terms of a current I versus time t diagram.

Alternatively, the information on the additional data bits may be modulated onto the transmit signal 320 by using a Manchester protocol. In this way, data bits may be included between directly succeeding pulses. Similar to the description above, more bits (e.g. three bit) per time interval can be added, if the event occurs with low speed, and less bits (e.g. one bit) per time interval can be added, if the event occurs with high speed.

As it was already shown in FIGS. 2 and 3, the number of bits of the additional data bits added or allocated to the different time intervals may be optionally varied in dependence on the length of the different time intervals. In other words, the signal processing unit 120 may optionally generate the transmit signal 122, so that an information of a number of bits of the additional data bits of the at least one frame comprised by a time interval of the differing time intervals varies in dependence on the length of the differing time intervals.

Figure 4:
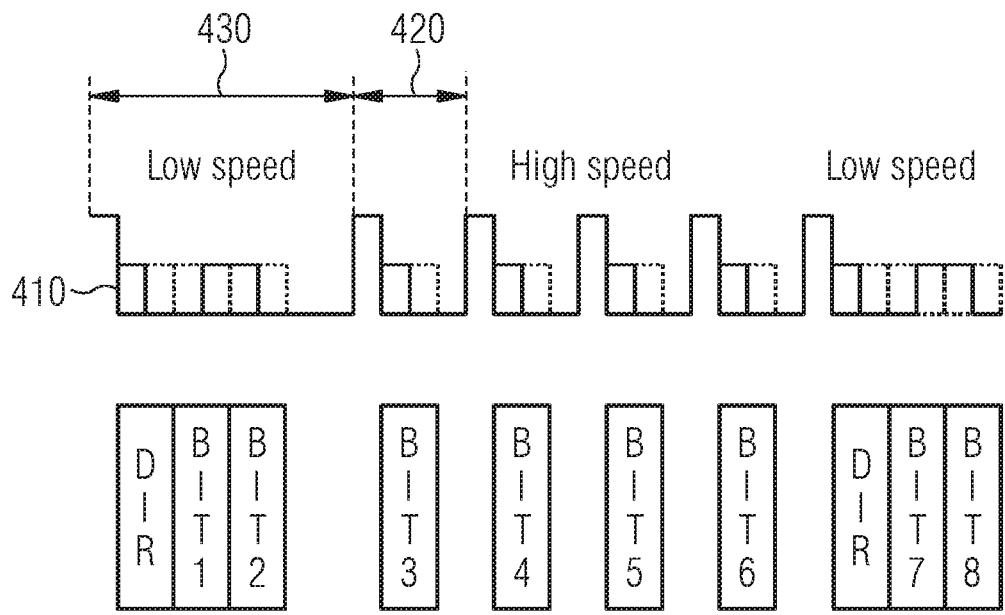
FIG. 4 shows a schematic illustration of a transmit signal.

An example for a transmit signal 410 with time intervals with different temporal length (e.g. time intervals representing events occurring with low speed and time intervals representing events occurring with high speed) is shown in FIG. 4. In this example, time intervals with short length 420 comprise less information on additional data accompanying the pulse associated to the time interval, than time intervals with large length 430. For example, a time interval with long length 430 may contain information on a rotation direction (DIR) and two bits of the additional data bits of the at least one frame (BIT 1, BIT 2). In contrast, a short time interval 420 may contain only information on one bit of the additional data bits of the at least one frame (e.g. BIT 3). In this example, the frame comprises eight additional data bits (BIT 1 to BIT 8) and is distributed over six directly succeeding time intervals with varying length according to the temporal occurrence of the event.

In other words, at least a first time interval of the differing time intervals comprises a first length and a second time interval of the differing time intervals comprises a second length and the first length is larger than the second length. In this case, the signal processing unit 120 may generate the transmit signal 122 so that the first time interval comprises information of a first number of bits of the additional data bits of the at least one frame and the second time interval comprises information of a second number of bits of the additional data bits of the at least one frame, while the first number is higher than the second number.

In this way, the number of bits for which a time interval contains the information can be dynamically adapted to the length of the respective time interval of the differing time intervals. Thus, the amount of transmittable additional data per time can be increased.

Optionally, the additional data further may comprise a separator preceding (or succeeding) the at least one frame. This separator may indicate a beginning (or an end) of the at least one frame and comprises a predefined number of separator bits. In other words, to signal the beginning of a frame or of the at least one frame, a separator comprising a predefined bit sequence can be added or allocated to the transmit signal 122 (e.g. also distributed over two or more time intervals). This predefined bit sequence can be identified by a decoder so that the decoder knows where the at least one frame begins. In this way, an efficient signaling of the beginning of the at least one frame can be realized and/or an easy decoding of the transmit signal 122 can be enabled.

Figure 5:
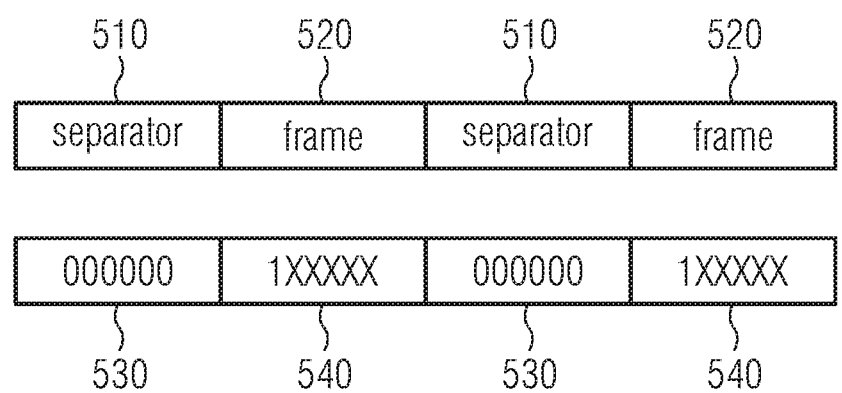
FIG. 5 shows a schematic illustration of a data transport layer.

An example for a sequence of separators 510 and frames 520 as well as an example for a sequence of separator bits 530 (e.g. with a predefined number of separator bits of 6) and a sequence of additional data bits 540 (e.g. with a predefined number of additional data bits of 6) is shown in FIG. 5. For example, a separator 510 together with a frame 520 represents one block of additional data to be transmitted as additional information with the transmit signal 122.

For example, the separator 520 comprises a unique bit sequence (e.g. 000000) and the frame 520 can comprise all bit sequences without the unique bit sequence of the separator (e.g. 1 followed by five arbitrary bits X).

The edge between a separator and a frame may be independently positioned with respect to the location of the pulses within the transmit signal 122. Therefore, it may be possible that information of one or more bits of the separator and one or more bits of the additional data bits of the frame are added, assigned or allocated to the same time interval. In other words, the signal processing unit 120 may generate the transmit signal 122 so that the information of at least one bit of the separator bits and at least one bit of the additional data bits of the at least one frame are comprised by the same time interval.

Since the allocation of the bits of the separator and frames is independent from the position of the pulses, the bits of the separator and the frames can be very flexibly allocated to the time intervals of the transmit signal 122. Further, the achievable data rate may be increased.

Optionally, the additional data comprises a predefined number of frames succeeding (or preceding) the separator so that the ratio of separator bits and additional data bits is improved. An example for a sequence of separators 610 and frames 620 as well as an example for a sequence of separator bits 630 (e.g. with a predefined number of separator bits of 6) and a sequence of additional data bits 640 (e.g. with a predefined number of additional data bits of 6) is shown in FIG. 5. In this case each separator 610 may be followed by three frames 620. Supplementary, the explanations mentioned in connection with FIG. 5 are also valid for FIG. 6.

For example, a 16 bit separator and a frame with 1 start bit and 15 data bits may be used. For example, the separator may be "0000 0000 0000 0000" (or any other bit sequence not used for a frame of additional data bits) and the additional data bits may start with a start bit "1". Further, the additional data bits of the frame may comprise 3 bit description (e.g. speed amplitude, dir (direction) amplitude, temperature information, error information), 7 bit information (e.g. speed/dir amplitude with 7 bit amplitude information or temperature, for example, −40 . . . 200° C. with 7 bits give 1.9° C. resolution), 1 bit direction information as redundancy and 4 bit parity for 11 data bits, for example.

Figure 6:
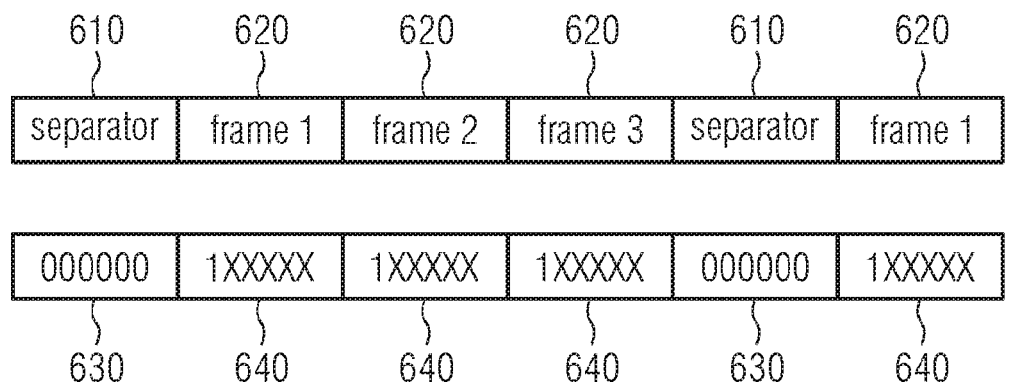
FIG. 6 shows a schematic illustration of another data transport layer.
Figure 7:
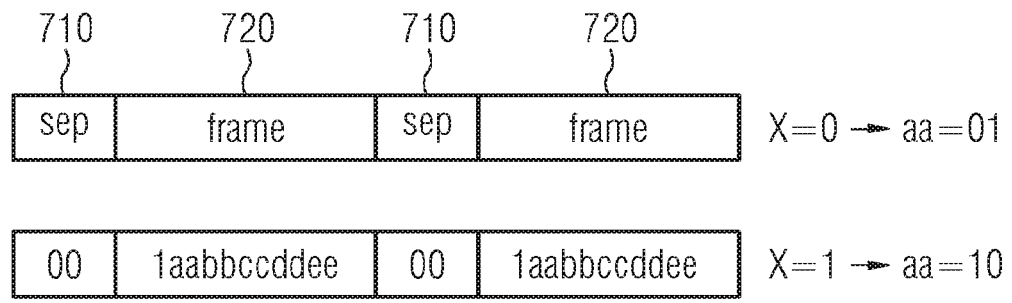
FIG. 7 shows a schematic illustration of another data transport layer.

Further, FIG. 7 shows an example for using a code alphabet for mapping the additional data to the transmit signal 122. In this example a Manchester code may be used to generate a separator 710 (e.g. with two bits=00) and a frame 720 (e.g. with 11 bits=1 aabbccddee). In this case, a data bit X may be mapped to a bit sequence of additional data bits aa (e.g. X=1−>aa=01 or X=0−>aa=10). Supplementary, the explanations mentioned in connection with FIG. 5 or 6 are also valid for FIG. 7.

Summarizing, optionally, the event information and the additional information may be part of a physical layer of a transmission protocol. Further, the at least one frame may part of a data transport layer of the transmission protocol. In this case, frames of additional data bits can be organized independent from the physical layer, so that additional data can be distributed over several time intervals of the differing time intervals and can be reconstructed by a decoder after transmission.

Figure 8:
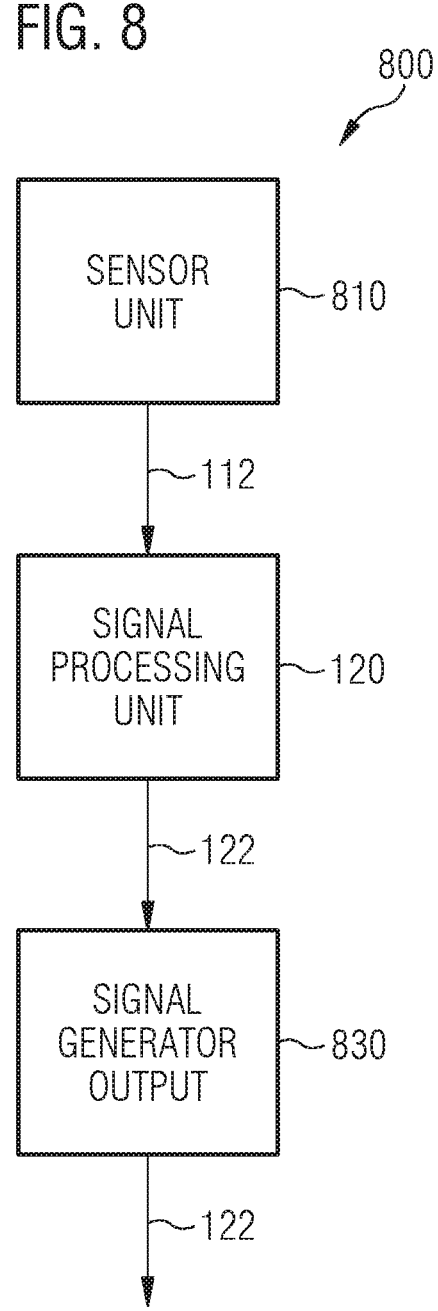
FIG. 8 shows a block diagram of a signal generator.

FIG. 8 shows a block diagram of a signal generator 800 according to an embodiment. This signal generator 800 is similar to the signal generator shown in FIG. 1. Therefore, supplementary, the explanations mentioned in connection with FIGS. 1 to 7 are also valid for FIG. 8. However, the signal provider is a sensor unit 810 and the signal generator 800 further comprises a signal generator output 830. The sensor unit 810 detects repeatedly the event, occurring within the differing time intervals. Further, the signal processing unit 120 may generate the transmit signal 122 and the signal generator output 830 may provide the transmit signal 122 (e.g. to a receiver or a decoder).

The sensor unit 830 may be a magnetic field sensor (e.g. hall sensor), an electric field sensor, a light sensor or any other sensor for detecting a repeatedly and within differing time intervals occurring event. Correspondingly, the repeatedly and within differing time intervals occurring event can represent a maximum, a minimum or a zero crossing of a magnetic or an electric field, a maximum, a minimum or a zero crossing of a light intensity or similar repeatedly occurring quantities.

The signal processing unit 120 may provide the transmit signal 122 through the signal generator output 830 by wireless or wire line transmission to a receiver or decoder, for example. For example, it may be possible that the signal generator 800 receives its power supply through a wire line connection from an electronic control unit. In this case, the signal processing unit 120 may modulate the transmit signal 122 through the signal generator output 830 onto the power supply wire line connection (e.g. two line connection).

Figure 9:
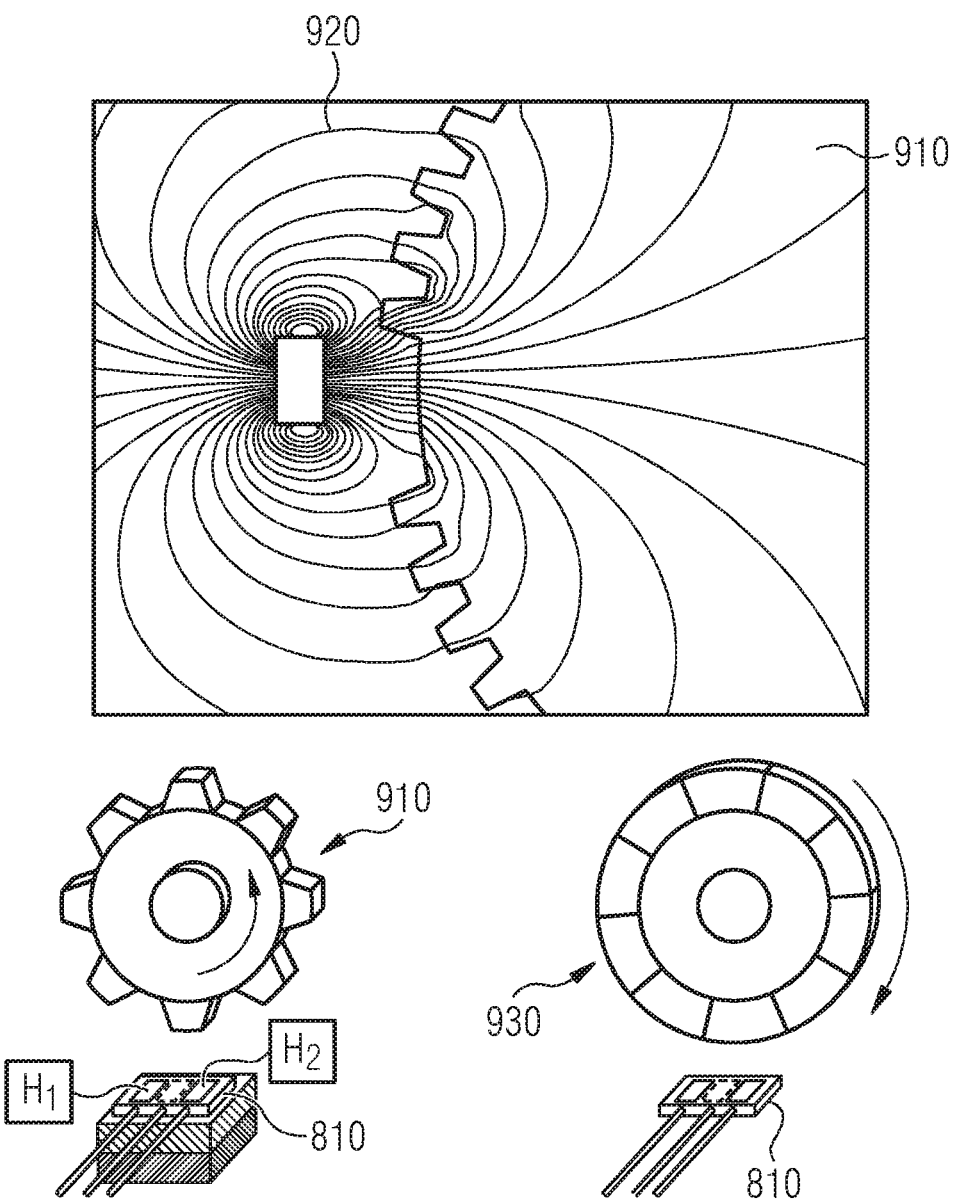
FIG. 9 shows a schematic illustration of the generation of a magnetic signal by a tooth wheel or a pole wheel.

In some applications, the signal generator 800 may be used to collect information to determine a speed of a rotating or moving part as well as additional information. Therefore, the sensor unit 810 may optionally detect repeatedly the event, occurring within the differing time intervals, which is caused by a moving or rotating part in the proximity (e.g. sufficiently close to detect the event reliably) of the sensor unit 810. Further, the differing time intervals of succeeding detected events corresponds to a speed of travel or a rotational speed of the moving or rotating part. For example, the moving or rotating part comprises a tooth wheel for deflecting a magnetic field or a magnetic pole wheel and the sensor unit is a magnetic sensor for detecting a maximum, minimum or zero-crossing of the magnetic field. An example for a tooth wheel 910 deflecting a magnetic field 920 in the proximity of a sensor unit 810 and a magnetic pole wheel 930 in the proximity of a sensor unit 810 is shown in FIG. 9.

In this way, the speed of the moving or rotating part can be determined based on the detected events. Further, additional information can be added to the transmit signal 122 based on the described concept.

Optionally, the sensor unit 810 may detect additionally a moving direction or a rotational direction of the moving or rotating part. This directional information may be added to the transmit signal 122 as additional information so that the receiver of the transmit signal 122 can get more information about the moving or rotating part.

Independent whether the sensor unit 810 detects or determines the direction data or the signal processing unit 120 determines the direction data, the processing unit may optionally generate the transmit data so that the additional data comprises direction data indicating the moving direction or the rotational direction of the moving or rotating part additionally to the at least one frame. In this way, a high amount of additional data can be provided.

The directional data can be coded in different ways. For example, the direction data is represented by one data bit. Further, the direction data may be comprised by each time interval of the differing time intervals as long as the length of the time intervals is above a predefined limit, for example. Especially at low speed, an information on the rotation direction (e.g. wheel rotation direction) or moving direction of a rotating or moving part may be important, since the rotation direction can easily be changed.

Consequently, in some applications, the direction information is less important at higher speed of the rotating or moving part (resulting in shorter time intervals). Therefore, optionally the additional data within a time interval comprises direction data, if the length of the time interval is below the predefined limit only. Consequently, above the predefined limit, more data capacity is available for the additional data bits of the at least one frame as well as further frames of additional data.

Some embodiments relate to a signal generator configured to generate a transmit signal based on a sensor signal indicating a repeatedly detected event occurring within differing time intervals. The transmit signal comprises pulses representing the temporal occurrence of the event and additional information representing additional data. Further, the additional data comprises at least one frame comprising a predefined number of additional data bits. Additionally, the signal generator is configured to generate the transmit signal so that the information of the additional data bits of the at least one frame is interrupted within the transmit signal by at least one pulse.

Further, the signal generator may comprise one or more additional, optional features realizing one or more aspects of the concept described above.

Some embodiments relate to a signal generator comprising means for providing a sensor signal indicating a repeatedly detected event occurring within differing time intervals, and means for generating a transmit signal based on the sensor signal. The transmit signal comprises event information representing the temporal occurrence of the event and additional information representing additional data. Further, the event information comprises pulses associated to the detected events, wherein the pulses are temporally separated within the transmit signal according to the differing time intervals of detected events so that each time interval of the differing time intervals comprises one pulse associated to a detected event. Further, the additional data comprises at least one frame comprising a predefined number of additional data bits. The information of the additional data bits of the at least one frame is distributed over at least two time intervals of the differing time intervals.

Further, the signal generator may comprise one or more additional, optional features realizing one or more aspects of the concept described above.

Some embodiments relate to a wheel speed sensor, a transmission speed sensor, a cam rotation speed sensor, a crankshaft rotation speed sensor, a rotation speed sensor or a position sensor with a signal generator according to the concept or one of the embodiments described above.

Figure 10:
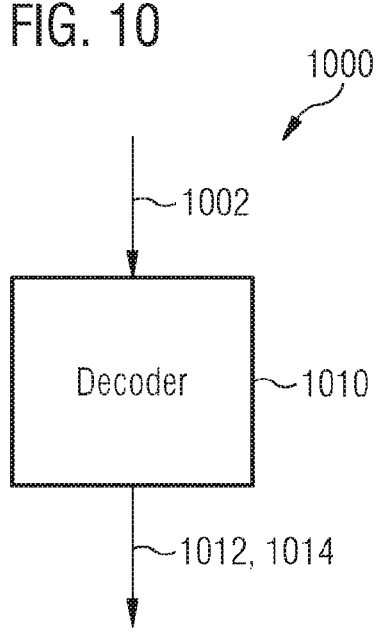
FIG. 10 shows a block diagram of a decoder.

FIG. 10 shows a block diagram of a decoder 1000 according to an embodiment. The decoder 1000 may determine speed data 1012 and additional decoded data 1014 based on a received signal 1002. The decoder 1000 may determine the speed data 1012 based on repeatedly and within differing time intervals occurring pulses within the receive signal 1002. Each time interval of the differing time intervals comprises one pulse. Further, the decoder 1000 may determine at least one frame of additional decoded data 1014 comprising a predefined number of additional data bits based on information obtained from at least two different time intervals of the different time intervals.

The decoder 1000 is able to extract speed data 1012 as well as a high or arbitrary amount of additional data from a receive signal 1002 with irregularly distributed pulses representing information about a speed of occurring events, since the information on the additional data can be distributed over more than one time interval between two pulses. For example, the speed data indicates a rotation or moving speed of a rotating or moving part.

The decoder 1000 may optionally comprise a wire line or a wireless receiver configured to receive the receive signal. Further, the decoder 1000 may optionally comprise a data output configured to provide the speed data 1012 and the additional decoded data 1014.

The decoder 1000 may comprise additional optional features corresponding to one or more of the aspects described in connection with the concept or an embodiment described above.

For example, optionally, a number of bits of the additional data bits of the frame obtained by the decoder 1000 from the same time interval may vary in dependence on a length of the differing time intervals. In this way, a high data rate can be enabled, since the time intervals can be exploited more efficiently.

Further, optionally, the decoder 1000 may determine direction data indicating a moving or rotating direction based on information obtained from a single time interval, for example. Directional data may need only few data capacity for transmission (e.g. only one bit) so that it can be transmitted within a single time interval. However, it can be repeatedly transmitted within different time intervals.

Figure 11:
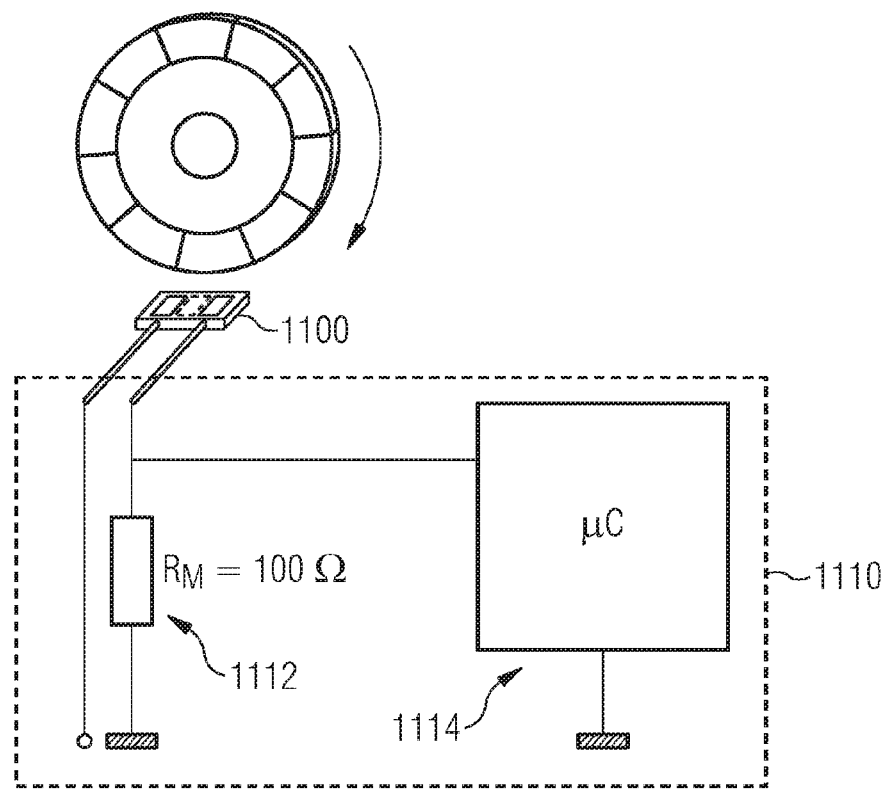
FIG. 11 shows a schematic illustration of a wheel speed sensor system.

Some embodiments relate to a wheel speed sensor system comprising a wheel speed sensor 1100 and a decoder 1110 as it is shown schematically in FIG. 11, for example. The signal generator may comprise a signal generator according to the described concept or an embodiment described above. Further, the decoder may be implemented according to the concept or an embodiment described above.

Figure 12:
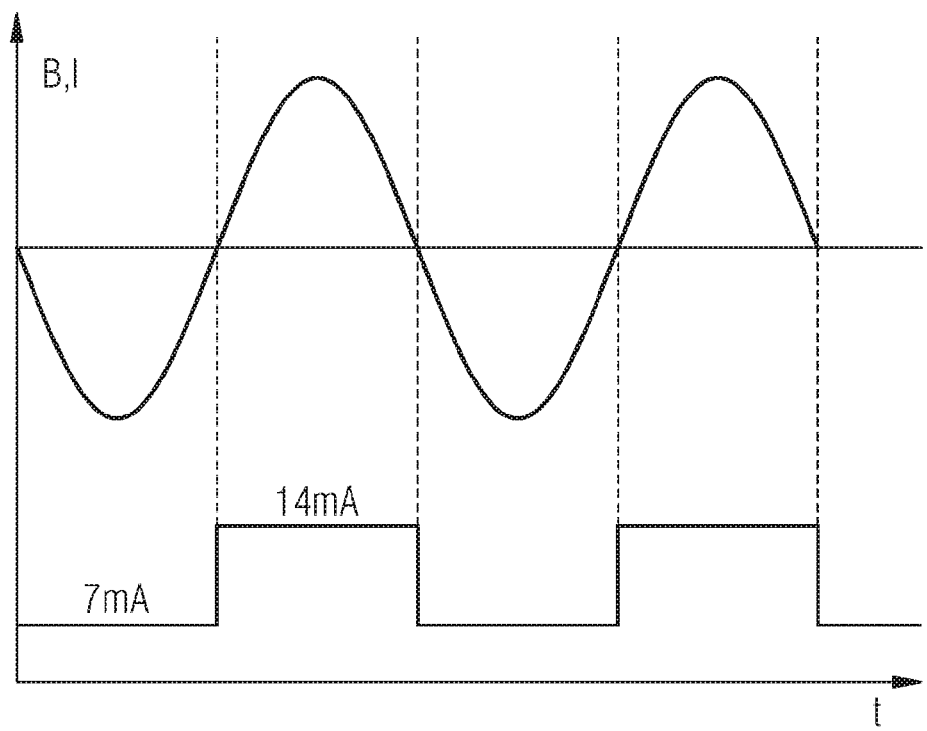
FIG. 12 shows a schematic illustration of a magnetic signal and a resulting sensor signal.

The decoder 1110 may comprise a receiver 1112 connected to a microcontroller 1114. The wheel speed sensor 1100 provides a current signal (transmit/receive signal) through a wire line connection to the receiver 1112 of the decoder 1110, for example. The receiver 1112 may convert the current signal to a voltage signal (e.g. using a shunt resistor with $R_M=100\Omega$) and provides the voltage signal to the microcontroller 1114 (e.g. electronic control unit or an on-board vehicle computer of a car). The microcontroller 1114 may determine the speed data (e.g. a rotation speed of the wheel) and the additional decoded data (e.g. direction of rotation, status of wheel speed sensor or other additional data). The power supply of the wheel speed sensor 1100 may be realized by the decoder 1110 through the wire line connection. For example, the sensor unit of the wheel speed sensor may be a magnetic field sensor detecting a magnetic field B of a pole wheel and provide a current signal I indicating zero-crossings of the magnetic field as it is shown in FIG. 12. This current signal (sensor signal) may be used by the signal processing unit of the wheel speed sensor 1100 to generate the transmit signal.

The signal provider 110, the signal processing unit 120, the signal generator output 830, the decoder 1010 and/or other optional units may be independent hardware units or part of a computer, a digital signal processor or a microcontroller as well as a computer program or a software product for running on a computer, a digital signal processor or a microcontroller, for example. The signal provider 110, the signal processing unit 120, the signal generator output 830 and/or other optional components may be implemented independently from each other or may be realized at least partly together (e.g. on the same die or by the same computer program).

Some embodiments relate to a wheel speed sensor protocol with nested protocol layer. This may extend an airbag protocol to allow to transmit additional data distributed over multiple periods of the speed signal, for example. For this, a magnetic signal may be generated either by tooth wheel that deflects the field of a backbias magnet through a sensor device or by a pole wheel that comprises alternating magnetic poles. For the case that the field is below its average value, the sensor may consume a supply current of 7 mA, for example, for the case the field is above the average it may double its supply current. On the electronic control unit side (ECU) the sensor supply current may be converted into a voltage and the edge (representing an occurring event) may be detected by the microcontroller. Alternatively, this may be done by the signal processing unit of the proposed signal generator and additional data may be added.

The (additional) information may be an indication of the rolling direction of a tire, a measure for the strength of the magnetic field or status information about sensor internal processes. By using the described concept, the amount of information that is transmitted with increasing speed must not be reduced, although the available time between two speed pulses is reciprocal to the speed of the car, for example. However, some information may no longer be needed at higher speed, for example the rotational direction cannot immediately change from high speed forward to high speed reverse without passing zero speed. Consequently, it may be no loss of information, if the direction information may not be transmitted at high wheel speed. Once the amount of information that is desired to be transmitted from the sensor to the electronic control unit (ECU) increases, which may be the case if additional measurements may be introduced, the data volume would exceed the few bits that may be addable to a single time interval.

The described concept may enable an increased transmittable data volume by distribution of the information over several wheel speed pulses. As already shown for example in FIG. 2, the message (in the example only 8 bit) is distributed over four low speed pulses which have the capability to transport three bits per pulse of whose one is occupied by the rotation direction or the same message can be distributed over eight high speed pulses which can only have a single attached bit, for example.

Even if the wheel speed changes during the transmission, the message may be filled into the available bit slots as already shown in FIG. 4. The separation of the message may be later handled on the data transport layer of the protocol, for example.

The examples may assume that the data that was included in a former protocol may be partly or completely moved into the data stream. This may be especially the case for information that can only change slowly like the magnetic field strength, for example. In the example, the rotation direction (DIR) bit was excluded from this assumption, since it may be used e.g. for the hill holder function of the car and should therefore be available with every information about the movement, if the speed is low. This partitioning between a former protocol content and the usage of general capacity is only an example and may be different depending on application requirements. It may range from using the whole channel capacity of an ABS protocol (antilock braking systems) for the data stream to examples where only one bit at every speed pulse may be used even at slow speed or the data stream may be only transmitted in a limited range of wheel speeds. This could, for example, be the case for a tire resonance frequency analysis application for indirect tire pressure monitoring systems (TPMS), since there may be no significant resonance oscillation in the case of slow speed due to the low mechanical stimulation. Further, it may also make sense to limit the resonance analysis to medium speed, if higher speeds arise additional higher order resonances of the tire that could disturb the measurement and reduce the reliability. Besides or instead of the indirect TPMS resonance data the transmitted data stream might also include other information that is extracted in the sense of or like the actual threshold level, the actual noise level, the calibration settings or any kind of status information and background test results, which may be important for functional safety reasons. The described concept may extend the communication flexibility of antilock braking system sensors (or other sensors) by orders of magnitude and may open up the ability to use additional functionality that can be implemented with new silicon technologies that provide high signal processing capability. Furthermore, the described concept may be applicable to antilock braking systems, but may not be limited to this application. It may be used in every other sensor application as well, e.g. in transmission speed sensors, cam or crankshaft rotation speed and/or position sensors.

In order to allow the recognition of the message a data link layer (data transport layer) may be introduced, for example. All information that shall be transmitted may be assembled to a data frame. The transmitted data stream may be constructed off the data frames and separators that allow to recognize the beginning of a new frame. The separator may be a sequence that cannot appear in the data frames. As already mentioned, FIG. 5 gives a simple construction example of a data stream. Each frame includes a start bit which may be always 1 followed by N bits (in the example N=5) of data load. In this case, a separator of N+1 zeros allows to recognize that a 1 after N+1 consecutive zeros may mark the beginning of a new frame. This example may be of low efficiency of N/(2N+2) of the data transfer.

The efficiency of the protocol may be improved by an increased number of frames that are grouped and separated by a single separator as already shown in FIG. 6, for example.

Another option may be the use of a code alphabet that limits the number of adjacent equal states in a symbol 2M.

In this case, the required separator may have a length of 2M+1. A simple example may be the Manchester code as already shown in FIG. 7, for example. It uses a symbol 01 (falling edge) for a high and a 10 (rising edge) for a low. In this case, the length is M=1 and the required separator would have a length of 2M+1=3. The efficiency of this Manchester encoded frame would be N/(2*N+3) and may be also bad since two bits are used for the transmission of a single data bit. However, it introduces redundancy and allows to recognize a transmission error, if there is an unexpected group of more than two equal bits in a message before the frame length is reached and the next separator is expected.

A Manchester code is only one example for illustrating the proposed concept of using code alphabets, but it may be developed for channel coding on a physical level where a timing of the transmitter may be reconstructed in order to separate a transmitted information. Thus, other choices of frame constructions and channel codes may be chosen without restriction of the physical layer, for example. The communication system theory and its applications in wireline and wireless communication systems may provide a wide range of protocols and coding schemes on every level of complexity, which may be used in combination with the described concept.

The introduction of a data transport layer may allow to transmit additional information distributed over several pulses or messages of a wheel speed sensor.

Figure 13:
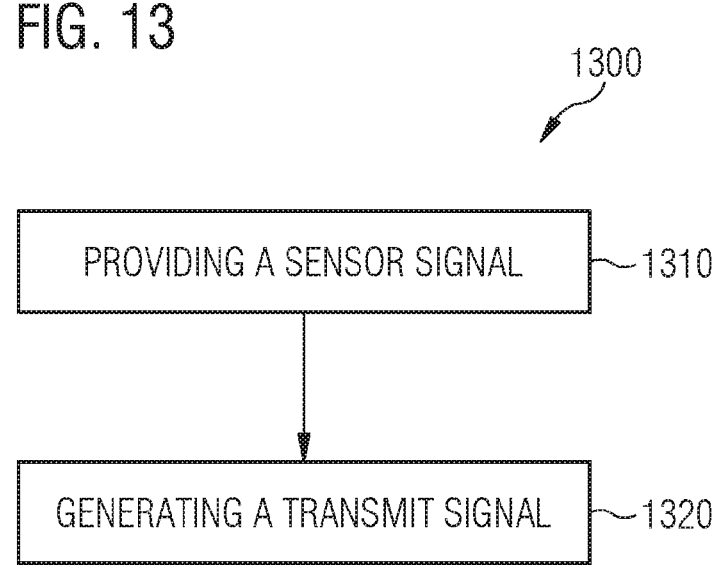
FIG. 13 shows a flowchart of a method for generating a transmit signal.

FIG. 13 shows a flow chart of a method 1300 for generating a transmit signal according to an embodiment. The method 1300 comprises providing 1310 a sensor signal indicating a repeatedly detected event, occurring within differing time intervals and generating 1320 a transmit signal based on the sensor signal. The transmit signal comprises event information representing the temporal occurrence of the event and additional information representing additional data. Further, the event information comprises pulses associated to detected events. These pulses are temporarily separated within the transmit signal according to the different time intervals of detected events so that each time interval of the differing time interval comprises one pulse. The additional data comprises at least one frame comprising a predefined number of additional data bits. Further, the information of the additional data bits of the at least one frame is distributed over at least two time intervals of the differing time intervals.

The method 1300 may comprise one or more additional, optional steps realizing one or more aspects of the concept described above.

Figure 14:
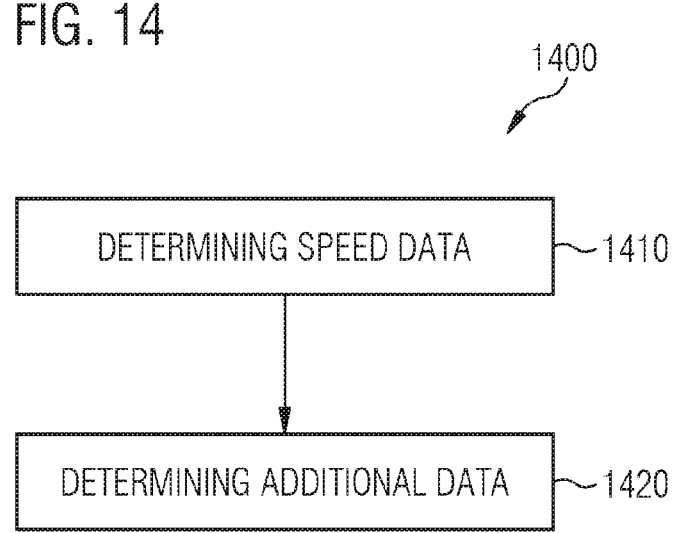
FIG. 14 shows a flowchart of a method for determining speed data.

FIG. 14 shows a flowchart of a method 1400 for determining speed data and additional decoded data based on a received signal according to an embodiment. The method comprises determining 1410 the speed data based on repeatedly and within differing time intervals occurring pulses with the receive signal. Each time interval of the differing time interval comprises one pulse. Further, the method 1400 comprises determining 1420 at least one frame of additional decoded data comprising a predefined number of additional data bits based on information obtained from at least two different time intervals of the differing time intervals.

The method 1400 may comprise one or more additional, optional steps realizing one or more aspects of the concept described above.

Figure 15:
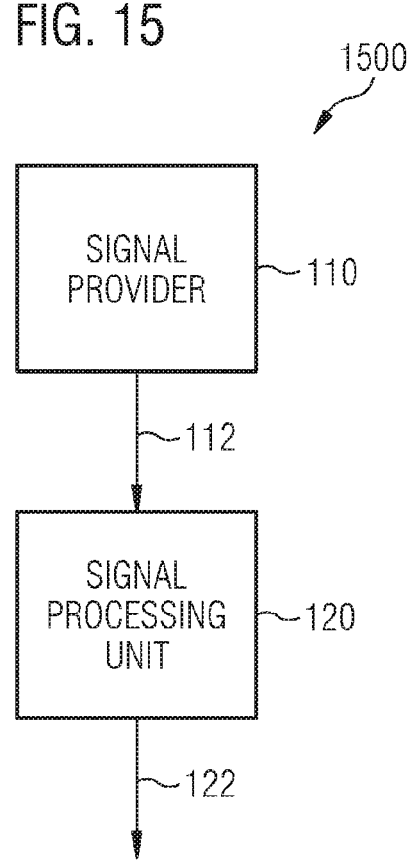
FIG. 15 shows a block diagram of a signal generator.

FIG. 15 shows a block diagram of a signal generator 1500 according to an embodiment. The signal generator 1500 comprises a signal provider 110 configured to provide a sensor signal 112 indicating a repeatedly detected event, occurring within differing time intervals. Further, the signal generator 1500 comprises a signal processing unit 120 configured to generate a transmit signal 122 based on the sensor signal 112. The transmit signal 122 comprises event information representing the temporal occurrence of the event and additional information representing additional data and the event information comprises (event) pulses associated to detected events. Further, the (event) pulses are temporally separated within the transmit signal 122 according to the differing time intervals of detected events so that each time interval of the differing time intervals comprises one pulse associated to a detected event. Additionally, the signal processing unit 120 is configured to generate the transmit signal 122 so that the transmit signal 122 comprises a plurality of alive pulses within a long time interval of the differing time intervals, if the long time interval is longer than twice a predefined alive notification time interval. Further, the alive pulses of the plurality of alive pulses are temporally separated within the long time interval so that every predefined alive notification time interval within the long time interval comprises one alive pulse. The additional data comprises at least one frame comprising a predefined number of additional data bits and the information of the additional data bits of the at least one frame is distributed over at least two predefined alive notification time intervals.

By adding information of additional data bits to the predefined alive notification time intervals, additional information can be transmitted also at very low speed of occurrence of the event or even in a standstill state.

The signal generator 1500 may start to send alive pulses, if a time interval between two succeeding detected events is longer than a (constant) predefined alive notification time interval. The alive pulses may signal or notify a device receiving the transmit signal that the signal generator 1500 is still working, although no or only seldom pulses of the detected event (e.g. event pulses or speed pulses) are transmitted due to a slow occurrence of the event to be detected. For example, the signal processing unit 120 may generate the transmit signal 122 so that the transmit signal 122 comprises at least one alive pulse within a long time interval of the differing time intervals, if the long time interval is longer than a predefined alive notification time interval. The predefined alive notification time interval may be longer than 50 ms (or longer than 80 ms) and/or shorter than 200 ms (or shorter than 150 ms or shorter than 120 ms), for example.

The signal generator 1500 may send alive pulses repeatedly, if a time interval (e.g. the long time interval) between two succeeding detected events gets very long or if no event is detected. For example, the transmit signal may comprise a plurality of alive pulses within the long time interval, if the long time interval is longer than twice the predefined alive notification time interval. Further, the alive pulses of the plurality of alive pulses may be temporally separated within the long time interval so that every predefined alive notification time interval comprises one alive pulse. For example, an alive pulse may be sent after every predefined alive notification time interval after a last (event) pulse caused by a detected event until the next event is detected.

Additionally, the information of the additional data bits of the at least one frame may be distributed over at least two predefined alive notification time intervals, so that a frame can have more data bits than a number of bits, which could be maximally transmitted in a single predefined alive notification time interval. For example, each predefined alive notification time interval of the predefined alive notification time intervals within the long time interval may comprise information of the same number of bits of the additional data bits of the at least one frame.

Optionally, the additional data may further comprise a separator preceding the at least one frame. The separator may indicate a beginning of the at least one frame and may comprise a predefined number of separator bits. Examples for separator bits of a separator and the additional data bits of each frame of a plurality of frames are shown in FIGS. 5, 6 and 7. Further, the information of the separator may be distributed over at least two predefined alive notification time intervals.

Figure 16:
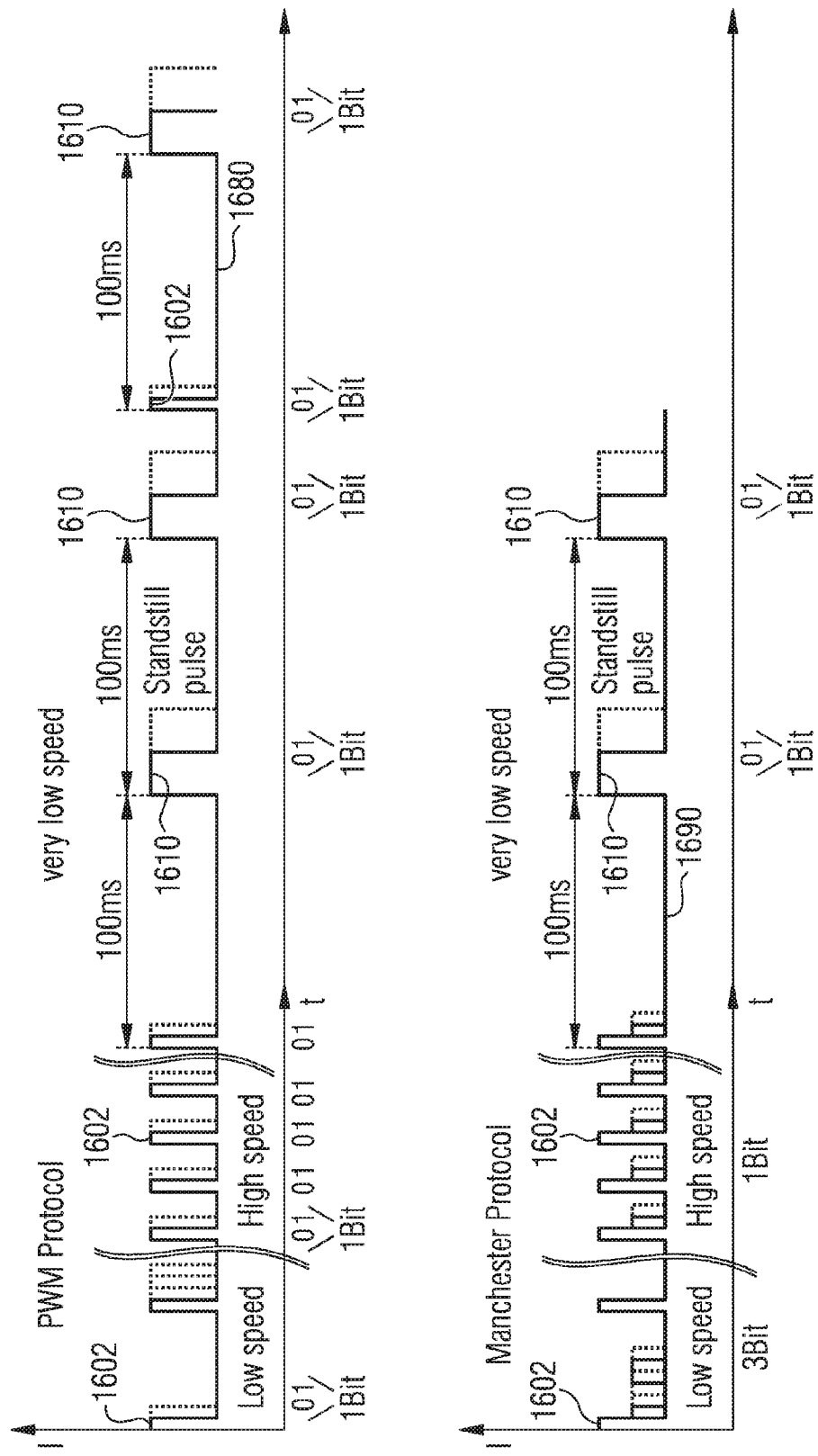
FIG. 16 shows a schematic illustration of a transmit signal based on pulse width modulation and a transmit signal based on Manchester coding including alive pulses.
Figure 17:
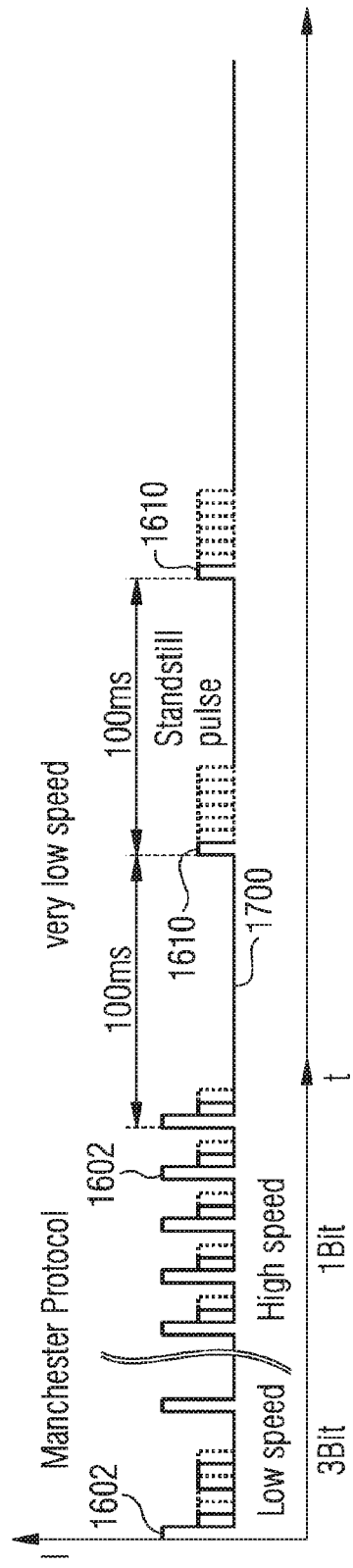
FIG. 17 shows a schematic illustration of another transmit signal based on Manchester coding including alive pulses.

For example, the signal processing unit 120 may map the information of at least a part of the additional data bits of the at least one frame to the transmit signal 120 by using a pulse width modulation of the alive pulses comprised by the predefined alive notification time intervals within the long time interval (e.g. FIG. 16) or by adding Manchester coded sequences to the predefined alive notification time intervals within the long time interval (e.g. FIGS. 16 and 17). Alternatively, the signal processing unit 120 may map the information of at least a part of the additional data bits of the at least one frame to the transmit signal 120 by modulation the current or voltage of the alive pulses (and/or the event pulses).

Additionally, the information of the additional data bits of the at least one frame may be distributed over at least two time intervals of the differing time intervals. For example, if the event starts to occur faster and the different time intervals of the detected events get shorter, the additional data bits can be distributed over not only several predefined alive notification time intervals within a single long time interval, but also over several time intervals of the differing time intervals.

More details and aspects are mentioned in connection with the embodiments described above or below. The embodiment shown in FIG. 15 may comprise one or more optional additional features corresponding to one or more aspects mentioned in connection with the proposed concept or one or more embodiments described above (e.g. FIGS. 1 to 14) or below (FIGS. 16-17).

FIG. 16 shows a schematic illustration of a transmit signal based on pulse width modulation and a transmit signal based on Manchester coding including alive pulses 1610 (or standstill pulses). For example, at high speed, additional data bits can be added to the time intervals of the differing time intervals. At high speeds, no alive pulses or standstill pulses may be added to the time intervals of the differing time intervals, since the next event pulse 1602 (pulse triggered by the detected event) is transmitted before the expiration of the predefined alive notification time interval (e.g. 100 ms). If the speed gets lower, the time intervals of the differing time intervals get longer and at a certain speed the time intervals are longer than the predefined alive notification time interval and one or more (e.g. at very low speed or standstill) alive pulses 1610 are transmitted. At low speed, additional data bits can be added not only after or in connection with the event pulse 1602, but also after or in connection with the alive pulses 1610. For example, a pulse width modulation of the alive pulse 1610 can be implemented to transmit one or more additional data bits with the alive pulse as indicated in the upper transmit signal 1680 of FIG. 16. Alternatively, additional data bits can be transmitted after each alive pulse 1610, for example, based on a Manchester protocol as shown by the lower transmit signal 1690 of FIG. 16. Only one bit of the additional data bits may be added after or in connection with an alive pulse 1610 or several additional data bits may be transmitted after or in connection with an alive pulse 1610 as shown in FIG. 17 for another transmit signal 1700 based on Manchester coding.

In the examples shown in FIGS. 16 and 17, the standstill protocol (e.g. output of standstill or alive pulse) may be applied always after a constant time after the last speed pulse. Alternatively, an internal timer may generate a monitoring window of predefined length. The predefined length of the monitoring window may be longer than 50 ms (or longer than 80 ms, for example, 100 ms) and/or shorter than 200 ms (or shorter than 150 ms or shorter than 120 ms). If a speed pulse is output within the monitoring window, no standstill or alive pulse is output (e.g. at the end of the monitoring window), for example. However, if no speed pulse is output within the monitoring window, a standstill or alive pulse is output at the end (or beginning) of the next 100 ms window, for example.

Figure 18:
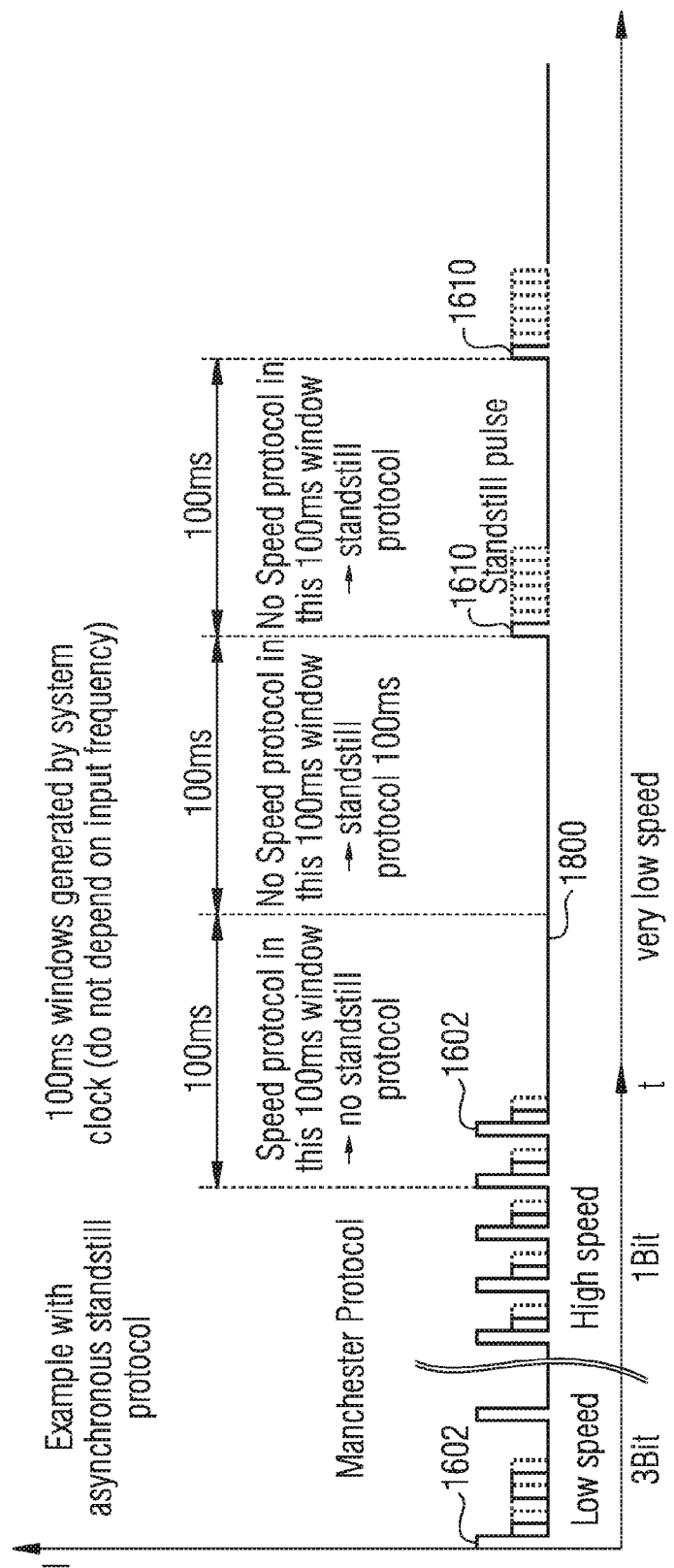
FIG. 18 shows a schematic illustration of another transmit signal based on Manchester coding including alive pulses.

FIG. 18 shows an example of a schematic illustration of a transmit signal 1800 with asynchronous standstill protocol. In this example, 100 ms windows are generated by a system clock (e.g. triggering an internal timer) of the signal generator, which does not depend on the input frequency (e.g. frequency of the event pulses or speed pulses). As example, three 100 ms windows are indicated in FIG. 18. In the first 100 ms window, speed protocol (e.g. performed by the signal processing unit) outputs at least one event/speed pulse 1602 (e.g. triggered by a detected event) so that no standstill protocol (e.g. performed by the signal processing unit) is applied to output a standstill/alive pulse. In the second and third 100 ms window, no speed protocol is applied to output an event/speed pulse so that the standstill protocol is applied to output a standstill/alive pulse 1610 at the end of the third window.

FIG. 19 shows a schematic illustration of another transmit signal 1900 similar to the example of FIG. 18. FIG. 19 indicates four 100 ms windows. In the first and third 100 ms window, speed protocol outputs at least one event/speed pulse 1602 so that no standstill protocol is applied to output a standstill/alive pulse. In the second and fourth 100 ms window, no speed protocol is applied to output an event/speed pulse so that the standstill protocol is applied to output a standstill/alive pulse 1610 at the end of the respective window.

Some embodiments relate to a decoder configured to determine speed data and additional decoded data based on a received signal. Further, the decoder is configured to determine the speed data based on repeatedly and within differing time intervals occurring pulses within the receive signal. Each time interval of the differing time intervals comprises one pulse and the receive signal comprises a plurality of alive pulses within a long time interval of the differing time intervals, if the long time interval is longer than twice a predefined alive notification time interval. Additionally, the alive pulses of the plurality of alive pulses are temporally separated within the long time interval so that every predefined alive notification time interval within the long time interval comprises one alive pulse. Further, the decoder is configured to determine at least one frame of additional decoded data comprising a predefined number of additional data bits based on information obtained from at least two predefined alive notification time intervals within the receive signal.

More details and aspects are mentioned in connection with the embodiments described above or below. The decoder may comprise one or more optional additional features corresponding to one or more aspects mentioned in connection with the proposed concept or one or more embodiments described above (e.g. FIGS. 1 to 17) or below.

Some embodiments relate to a method for generating a transmit signal. The method comprises providing a sensor signal indicating a repeatedly detected event, occurring within differing time intervals and generating a transmit signal based on the sensor signal. The transmit signal comprises event information representing the temporal occurrence of the event and additional information representing additional data. The event information comprises pulses associated to detected events and the pulses are temporally separated within the transmit signal according to the differing time intervals of detected events so that each time interval of the differing time intervals comprises one pulse associated to a detected event. Further, the transmit signal comprises a plurality of alive pulses within a long time interval of the differing time intervals, if the long time interval is longer than twice a predefined alive notification time interval. The alive pulses of the plurality of alive pulses are temporally separated within the long time interval so that every predefined alive notification time interval within the long time interval comprises one alive pulse. Additionally, the additional data comprises at least one frame comprising a predefined number of additional data bits and the information of the additional data bits of the at least one frame is distributed over at least two predefined alive notification time intervals.

More details and aspects are mentioned in connection with the embodiments described above or below. The method for generating a transmit signal may comprise one or more optional additional features corresponding to one or more aspects mentioned in connection with the proposed concept or one or more embodiments described above (e.g. FIGS. 1 to 17) or below.

Some embodiments relate to an extended PWM protocol. The protocol (e.g. for the transmission application) may transmit not only speed and rotation direction of the wheel, but also safety-relevant information, e.g., error bit, error description, signal amplitude, etc.

Other protocols may transmit the speed information using 21 mA current pulses, the direction information and additional information may be transmitted using 14 mA pulses (usually, a 14 mA current is consumed in this context), for example. By using such protocols, the additional bits may only be transmitted up to a limited speed. E.g., the bit 8 may only be transmitted up to a frequency of 1.8 kHz, the bit 0 may be transmitted up to 6.6 kHz. The protocol could thus only indicate an error up to 6.6 kHz and only transmit more detailed information up to 1.8 kHz, for example. For example, such protocols are not applicable in this form as the transmission application should also enable the use of frequencies up to 16 kHz. Even though, theoretically, higher data rates could also be used, the current length of the 21 mA speed pulse of 50 µs may already constitute the time resolution of such implementations of TCUs (transmission control units).

According to an aspect, the PWM protocol from a transmission application may be extended. A PWM protocol may transmit during each zero crossing and may use 2 pulse lengths (e.g. a 30 µs pulse indicates that the wheel turns clockwise and a 60 µs pulse indicates that the wheel turns counterclockwise), for example. The proposed extended protocol may use four different pulse lengths, 2 for each rotation direction (e.g. a 15 µs or 30 µs pulse indicates that the wheel turns clockwise and a 45 µs or 60 µs pulse indicates that the wheel turns counterclockwise). Now, a data bit may also be transmitted during each zero crossing in addition to the direction information (e.g. a 15 µs or 45 µs pulse stands for a '0' and a 30 µs or 60 µs pulse stands for '1').

FIG. 20 shows the pulse pattern 2000 (transmit signal) that may be emitted during a clockwise rotation and may transmit a different bit pattern. For example, an initialization sequence (e.g. separator) may be transmitted after every 20 pulses. Further, data may be transmitted by a pulse width modulation of the speed pulses (e.g. zero crossing of detected magnetic field, which may represent the event to be detected) and/or alive pulses (not shown).

This may be expanded by defining the protocol, for example, a 33 bit sequence to be transmitted (e.g. 33 signal periods may be needed to fully transmit a protocol frequency, protocol sequence or protocol frame). This sequence may, for example, be composed by 13+8 bit of data communication, 7 bit temperature (−40 . . . 200° C. with 7 bits gives 1,9° resolution), 1 bit error bit (proposal to add here also startup information), 3 bit error description (speed too small, dir too small, jitter too high), optional 1 bit direction information as redundancy, 4 bit parity (e.g. Hamming 15,11), 1 bit additional parity and 8+1 start bits.

Further, the protocol may also be extended by a standstill pulse (alive pulse). Here, 2 pulse lengths may be used as well (e.g. a 75 µs pulse for a standstill pulse with the information '0' and a 90 µs pulse for a standstill pulse with the information '1'). For example, the protocol may also be used without (or at slow) wheel rotation.

According to an aspect, direction information may be transmitted up to a maximum rotation frequency (16 kHz), additional information (error information) may be transmitted from 0 Hz to 16 kHz, at 0 Hz a 33 bit sequence at the standstill pulse may be transmitted within 3.2 s (e.g. the transmission may go quicker during a rotational motion), the emission energy of the protocol (EMC) may be comparable to other transmission PWM protocols and/or TCUs may be used to decode the protocol (e.g. only a software change and no hardware change (e.g., 21 mA current level) may be required).

The extended PWM protocol may transmit both direction information and additional information. The protocol may be optimized for a transmission application (in a vehicle, for example, a car).

Alternatively, different current levels and/or voltage levels may be used instead of different pulse lengths.

The proposed approach may be combined with other protocols as well. For example, the error bit of other protocols may be extended based on the proposed concept so that more information may be transmittable up to higher rotation speeds.

Embodiments may further provide a computer program having a program code for performing one of the above methods, when the computer program is executed on a computer or processor. A person of skill in the art would readily recognize that steps of various above-described methods may be performed by programmed computers. Herein, some embodiments are also intended to cover program storage devices, e.g., digital data storage media, which are ma-chine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods or (field)

programmable logic arrays ((F)PLAs) or (field) programmable gate arrays ((F)PGAs), programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

What is claimed is:

1. A signal generator comprising:
a signal provider configured to provide a sensor signal indicating a repeatedly detected event, occurring within differing time intervals; and
a signal processing unit configured to generate a transmit signal based on the sensor signal, wherein the transmit signal comprises event information representing a temporal occurrence of the detected event and additional information representing additional data, wherein the event information comprises pulses associated to the detected events, wherein the pulses are temporally separated within the transmit signal according to the differing time intervals of the detected events so that each time interval of the differing time intervals comprises one pulse associated to a corresponding detected event, wherein the additional data comprises at least one frame comprising a predefined number of additional data bits, wherein the additional information of the additional data bits of the at least one frame is distributed over at least two time intervals of the differing time intervals,
wherein the signal processing unit is configured to generate the transmit signal so that the transmit signal comprises at least one alive pulse within a long time interval of the differing time intervals, if the long time interval is longer than a predefined alive notification time interval, wherein the at least one alive pulse is configured to notify a device receiving the transmit signal that the signal generator is still working.

2. The signal generator according to claim 1, wherein the transmit signal comprises a plurality of alive pulses within the long time interval, if the long time interval is longer than twice the predefined alive notification time interval, wherein the alive pulses of the plurality of alive pulses are temporally separated within the long time interval so that every predefined alive notification time interval comprises one alive pulse.

3. The signal generator according to claim 2, wherein the signal processing unit is configured to map the additional information of at least a part of the additional data bits of the at least one frame to the transmit signal by using a pulse width modulation of the alive pulses comprised by the predefined alive notification time intervals within the long time interval or by adding Manchester coded sequences to the predefined alive notification time intervals within the long time interval.

4. The signal generator according to claim 2, wherein the additional information of the additional data bits of the at least one frame is distributed over at least two predefined alive notification time intervals.

5. The signal generator according to claim 4, wherein each predefined alive notification time interval of the predefined alive notification time intervals within the long time interval comprises information of the same number of bits of the additional data bits of the at least one frame.

6. The signal generator according to claim 2, wherein the additional data further comprises a separator preceding the at least one frame, wherein the separator indicates a beginning of the at least one frame and comprises a predefined number of separator bits, wherein the information of the separator is distributed over at least two predefined alive notification time intervals.

7. The signal generator according to claim 1, wherein the predefined alive notification time interval is longer than 50 ms and shorter than 200 ms.

8. The signal generator according to claim 1, wherein the signal provider is a sensor unit and the signal generator further comprises a signal generator output, wherein the sensor unit is configured to detect repeatedly the events, occurring within the differing time intervals, wherein the signal generator output is configured to provide the transmit signal.

9. The signal generator according to claim 8, wherein the sensor unit is configured to detect repeatedly the events occurring within the differing time intervals, which is caused by a moving or rotating part in the proximity of the sensor unit, wherein the lengths of the differing time intervals between succeeding detected events depend on a speed of travel or a rotational speed of the moving or rotating part.

10. The signal generator according to claim 9, wherein the sensor unit is configured to detect additionally a moving direction or a rotational direction of the moving or rotating part and provide this direction data.

11. The signal generator according to claim 1, wherein the signal processing unit is configured to generate transmit data of the transmit signal, so that the additional data to be added to the transmit data comprises direction data indicating the moving direction or the rotational direction of the moving or rotating part additionally to the at least one frame.

12. The signal generator according to claim 11, wherein the direction data is represented by one data bit, wherein information of the direction data is comprised by each time interval of the differing time intervals as long as the length of the time intervals is above a predefined limit.

13. The signal generator according to claim 12, wherein the additional data within a time interval comprises direction data, if the length of the time interval is above the prefined limit only.

14. A signal generator comprising:
signal provider configured to provide a sensor signal indicating a repeatedly detected event, occurring within differing time intervals; and
a signal processing unit configured to generate a transmit signal based on the sensor signal, wherein the transmit signal comprises event information representing a temporal occurrence of the detected event and additional information representing additional data, wherein the event information comprises pulses associated to the detected events, wherein the pulses are temporally separated within the transmit signal according to the differing time intervals of the detected events so that each time interval of the differing time intervals comprises one pulse associated to a corresponding detected event,
wherein the signal processing unit is configured to generate the transmit signal so that the transmit signal comprises a plurality of alive pulses within a long time interval of the differing time intervals, if the long time interval is longer than twice a predefined alive notification time interval, wherein the alive pulses of the plurality of alive pulses are temporally separated within the long time interval so that every predefined alive notification time interval within the long time interval comprises one alive pulse, wherein the one alive pulse is configured to notify a device receiving the transmit signal that the signal generator is still working,
wherein the additional data comprises at least one frame comprising a predefined number of additional data bits, wherein the additional information of the additional data bits of the at least one frame is distributed over at least two predefined alive notification time intervals.

15. The signal generator according to claim 14, wherein the additional information of the additional data bits of the at least one frame is distributed over at least two time intervals of the differing time intervals.

16. A decoder configured to determine speed data and additional data based on a received signal transmitted by a signal generator, wherein the decoder is configured to determine the speed data based on repeatedly and within differing time intervals occurring pulses within the received signal, wherein each time interval of the differing time intervals comprises one pulse,
wherein the received signal is generated based on a sensor signal of a signal provider indicating a repeatedly detected event, occurring within the differing time intervals, and comprises event information representing a temporal occurrence of the detected events and additional information representing additional data, wherein the event information comprises pulses associated to the detected events, wherein the pulses are temporally separated within the received signal according to the differing time intervals of the detected events so that each time interval of the differing time intervals comprises the one pulse associated to a corresponding detected event, wherein the additional data comprises at least one frame comprising a predefined number of additional data bits, wherein the additional information of the additional data bits of the at least one frame is distributed over at least two time intervals of the differing time intervals,
wherein the received signal comprises a plurality of alive pulses within a long time interval of the differing time intervals, if the long time interval is longer than twice a predefined alive notification time interval, wherein the alive pulses of the plurality of alive pulses are temporally separated within the long time interval so that every predefined alive notification time interval within the long time interval comprises one alive pulse, wherein the one alive pulse is configured to notify the decoder that the signal generator transmitting the received signal is still working,
wherein the decoder is configured to determine the at least one frame of the additional data comprising the predefined number of the additional data bits based on information obtained from at least two predefined alive notification time intervals within the received signal.

17. A method for generating a transmit signal, the method comprising:

providing a sensor signal, by a signal provider, indicating a repeatedly detected event, occurring within differing time intervals; and generating a transmit signal, by a signal processing unit, based on the sensor signal, wherein the transmit signal comprises event information representing a temporal occurrence of the detected event and additional information representing additional data, wherein the event information comprises pulses associated to the detected events, wherein the pulses are temporally separated within the transmit signal according to the differing time intervals of the detected events so that each time interval of the differing time intervals comprises one pulse associated to a corresponding detected event, wherein the transmit signal comprises a plurality of alive pulses within a long time interval of the differing time intervals, if the long time interval is longer than twice a predefined alive notification time interval, wherein the alive pulses of the plurality of alive pulses are temporally separated within the long time interval so that every predefined alive notification time interval within the long time interval comprises one alive pulse, wherein the one alive pulse is configured to notify a device receiving the transmit signal that a signal generator generating the transmit signal is still working, wherein the additional data comprises at least one frame comprising a predefined number of additional data bits, wherein the additional information of the additional data bits of the at least one frame is distributed over at least two predefined alive notification time intervals.

* * * * *